(12) United States Patent
Holtrop et al.

(10) Patent No.: US 6,357,388 B1
(45) Date of Patent: Mar. 19, 2002

(54) CAT LITTER MAT

(75) Inventors: James S. Holtrop, Washington; Carey D. Widder, St. Louis, both of MO (US)

(73) Assignee: Solutia Inc., St. Louis, MO (US)

( * ) Notice: Subject to any disclaimer, the term of this patent is extended or adjusted under 35 U.S.C. 154(b) by 33 days.

(21) Appl. No.: 09/084,486

(22) Filed: May 26, 1998

(51) Int. Cl.[7] .............................................. A01K 29/00
(52) U.S. Cl. ...................... 119/28.5; 119/161; 119/526; 5/417
(58) Field of Search ................................ 119/28.5, 169, 119/161, 612, 526; 5/417

(56) References Cited

U.S. PATENT DOCUMENTS

| | | | |
|---|---|---|---|
| 151,766 A | * | 6/1874 | Ellis |
| 378,369 A | * | 2/1888 | Hyer |
| 3,332,828 A | * | 7/1967 | Faria et al. |
| 3,507,010 A | * | 4/1970 | Doleman et al. |
| 3,617,413 A | * | 11/1971 | Elbert .......................... 156/61 |
| 3,729,364 A | | 4/1973 | Doleman et al. .............. 161/36 |
| 3,752,121 A | * | 8/1973 | Brazzell ...................... 119/169 |
| 4,038,944 A | * | 8/1977 | Tucci .......................... 119/458 |
| 4,356,220 A | * | 10/1982 | Benedyk ....................... 428/17 |
| 4,361,605 A | * | 11/1982 | Butler et al. ................... 428/17 |
| 4,361,606 A | * | 11/1982 | Butler et al. ................... 428/17 |
| 4,932,663 A | * | 6/1990 | Makar ......................... 473/262 |
| 4,961,930 A | * | 10/1990 | Perdelwitz, Jr. et al. ..... 424/411 |
| 5,110,133 A | * | 5/1992 | Durso ......................... 473/218 |
| 5,159,896 A | | 11/1992 | Mortillo et al. |
| 5,220,886 A | * | 6/1993 | Hyde .......................... 119/165 |
| 5,272,236 A | * | 12/1993 | Lai et al. ................... 526/348.5 |
| 5,429,073 A | * | 7/1995 | Ballard ........................ 119/171 |
| 5,507,845 A | * | 4/1996 | Molnar et al. ................. 47/1.01 |
| 5,676,090 A | * | 10/1997 | Cannaday, Jr. .............. 119/165 |
| 5,797,352 A | * | 8/1998 | Ebert .......................... 119/652 |
| 5,830,080 A | * | 11/1998 | Reynolds ..................... 473/278 |
| 5,879,614 A | * | 3/1999 | Harrison ...................... 264/510 |
| 5,932,659 A | * | 8/1999 | Bambara et al. ............. 525/240 |

FOREIGN PATENT DOCUMENTS

EP        0 561 104 AT    8/1992    .......... A01K/31/16

OTHER PUBLICATIONS

Engage Polyolefin Elastomers, Dow Plastics, Jan., 1994, 19 pp.

* cited by examiner

*Primary Examiner*—Charles T. Jordan
*Assistant Examiner*—Yvonne R. Abbott
(74) *Attorney, Agent, or Firm*—Lathrop & Gage L.C.

(57) ABSTRACT

A cat litter mat having flexible, paw-engaging projections formed of thermoplastic polyolefin elastomer, preferably a blend of such elastomer with low density polyethylene.

5 Claims, 2 Drawing Sheets

CAT LITTER MAT

BACKGROUND OF THE INVENTION

This invention relates to a cat litter mat.

In urban environments such as apartments and residential homes, trained felines, such as cats and like animals, deposit their waste in a litter box. Litter on which the animal waste is deposited is typically granulated absorbent material. In using the box the litter often becomes attached to the cat's paws, and is dragged from the box and messily deposited on the floor in the home or apartment, and, if the occasion arises, sometimes even buried. Also, after use a cat often kicks the litter around in the box which can result in ejecting it onto the surrounding floor.

Mats or pads on which the cat steps on exiting the box are known. Their purpose is to dislodge litter from the cat's paws as it walks across the mat to thereby avoid dragging it about the surrounding area. Some prior art mats have short, spike-like projections intended to enter and spread the soft pads on the underside of the cat's paws to allow litter wedged between and on the pads to fall onto the mat before the cat reaches its edge. Cats paws, however, are quite sensitive and they dislike standing on rigid projections jabbing their paws with the result that the cat frequently shies away from using the liter box altogether.

It would be desirable to provide an animal liter mat more amenable to the liking of the animal using it.

SUMMARY OF THE INVENTION

Now, improvements have been made in animal litter mats which overcome shortcomings of the prior art.

Accordingly, a principal object of this invention is to provide an improved waste-containment mat for an animal such as a cat.

Other objects will in part be obvious and will in part appear from the following description and claims.

These and other objects are accomplished by providing a cat litter mat having flexible, paw-engaging projections formed of thermoplastic polyolefin elastomer. The projections are preferably formed of a thermoplastic polymeric blend of 20 to 90 preferably 35 to 65 wt. % polyolefin elastomer and 80 to 10% preferably 65 to 35 wt. % polyethylene—preferably low density polyethylene.

BRIEF DESCRIPTION OF THE DRAWINGS

In describing the overall invention, reference will be made to the accompanying drawings wherein.

DETAILED DESCRIPTION OF THE INVENTION

Figure 1:
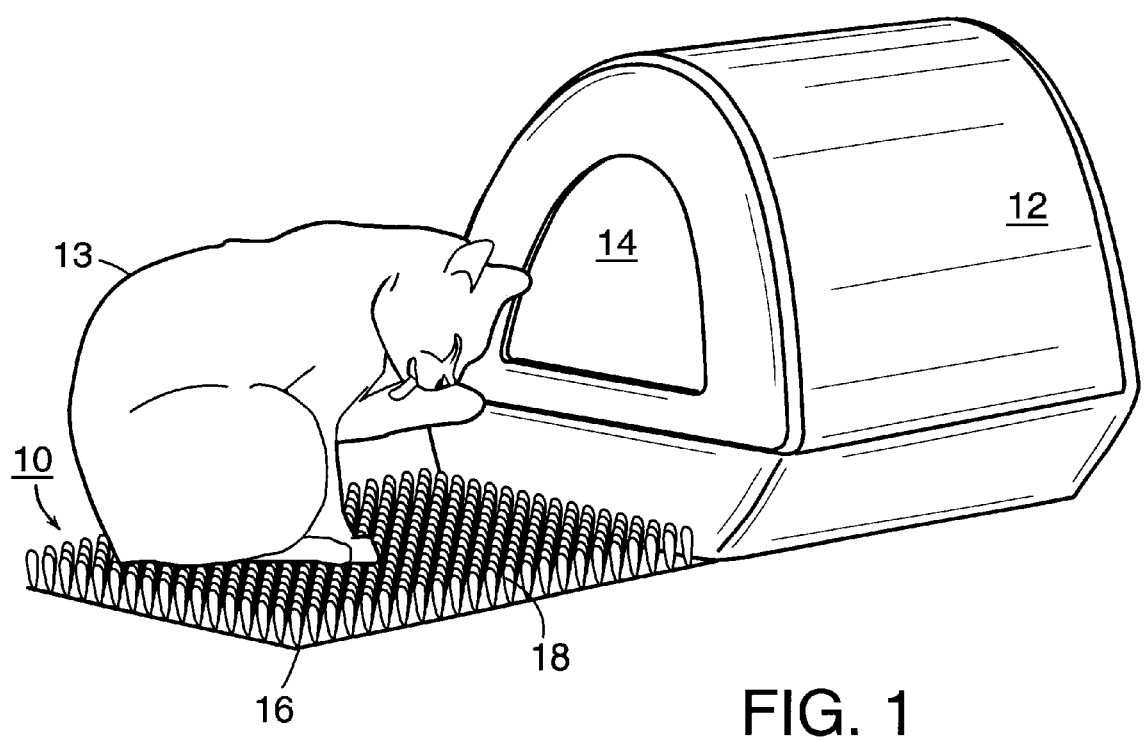
FIG. 1 is a perspective view of a waste containment system for a cat illustrating a cat litter mat according to the invention.

Referring to the drawings, waste containment system in FIG. 1 comprises cat litter mat 10 resting on a flat surface such as a floor adjacent litter compartment 12. Compartment 12 containing litter, not shown, is a covered box having opening 14 large enough for passage of cat 13. Compartment 12 may differ in configuration from and vary widely from that shown; e.g. it may be open top or closed top and only functions to contain litter and animal waste.

Mat 10 is a three dimensional, one piece structure comprising a multitude of soft, paw-engaging projections 18 integral with and at least in part generally extending perpendicularly up (on the order of about ⅜ to ⅝ in.–0.95 to 1.6 cm) from base 16. Optional backing 20 of fabric or plastic film is bonded thermally or with an adhesive to the underside of base 16 after molding of mat 10.

Figure 2:
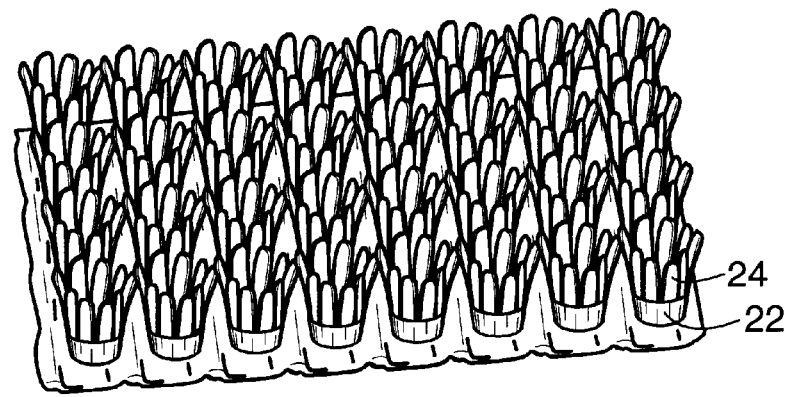
FIGS. 2–4 are fragmentary perspective views of cat litter mat embodiments of the invention.
Figure 3:
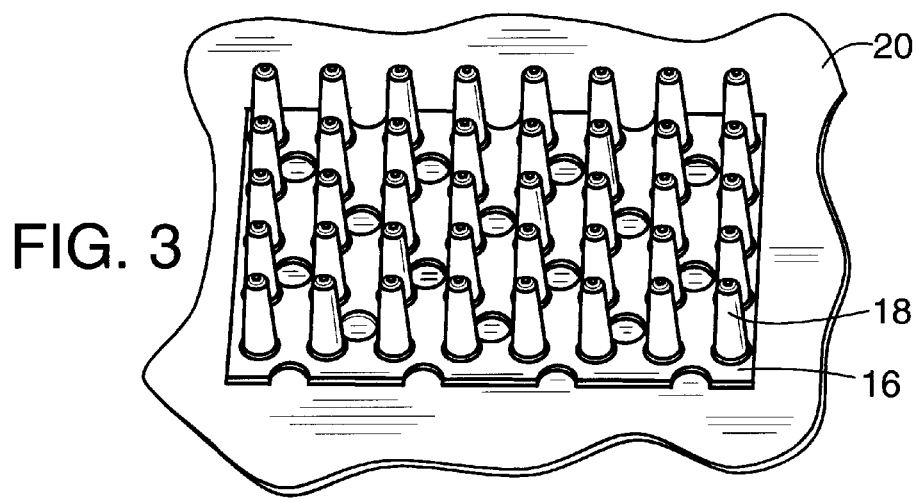
Figure 4:
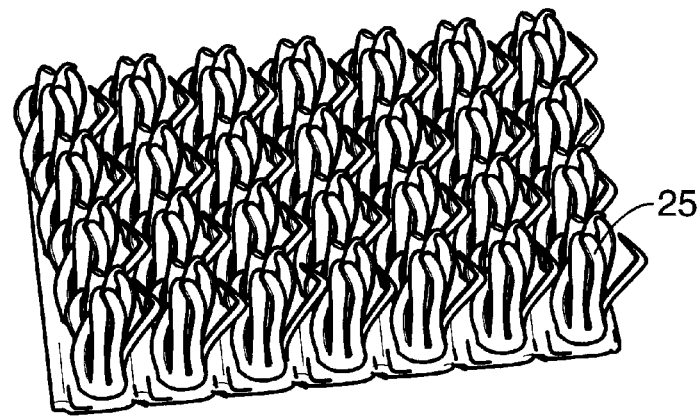

In the illustrated embodiments, projections 18 are evenly spaced from each other and arranged in mutually perpendicular rows on base 16. In FIG. 3 projections 18 are solid whereas in the preferred form of FIG. 2 they are a multitude of vertically short cup-like bases 22 from each of which projects clusters of blade-like extensions 24 which are rectangular in cross section. In the FIG. 4 embodiment the upper end portions or tips 25 of the blade-like extensions 24 of FIG. 2 are disordered in orientation and irregularly project in many directions as shown. The FIG. 4 structure is formed by texturing the FIG. 2 version in the final step of the mat fabrication process to be further described.

Cat litter mat 10 having a multitude of projections 18 extending from a base 16 may be shaped differently from those shown. For example, projections 18 may be randomly positioned in a disordered pattern on the base, may be individually configured differently, e.g. circular or the like in cross section and may be assembled from a plurality of components instead of being one piece —e.g. the projections may be separately formed of one material in a grid and then bonded to a planar base, optionally of a different material.

According to the invention, paw engaging projections 18 of cat liter mat 10 are either entirely or partially formed of thermoplastic polyolefin elastomer. Preferably the entire mat including projections 18 are of a blend of molded thermoplastic polymer of 35 to 65 wt. % polyolefin elastomer and 65 to 35 wt. % of another thermoplastic material such as polyethylene, preferably low density polyethylene having a density of 0.910 to 0.925 gm/cc. To facilitate forming the textured embodiment of FIG. 4, the elastomeric content of the polymeric blend is about 50 to 60 wt. %.

Usable polyolefin, e.g. polyethylene, elastomers typically have a density of 0.820 to 0.905 gm/cc and are commercially available from Dupont—Dow Elastomer L.L.C. of Wilmington, Delaware as Engage™, specifically type EG 8200. Also usable as polyolefin elastomer is Exact™, specifically type 4033 from Exxon Chemical Co.

Mat 10 is fabricated by conventional cyclic batch injection molding wherein molten thermoplastic is forcibly injected into a closed mold conforming to the finished article shape, followed by cooling of the mold to set the thermoplastic and ejection of the formed article from the mold. Preferably injection molding is continuous according to the method and apparatus disclosed in U.S. Pat. No. 3,729,364, to Doleman et al, the molding disclosure of which is incorporated herein by reference. Briefly, in the system of that patent the thermoplastic components to form mat 10 are dry blended, optionally along with other additives such as coloring pigments, antioxidants and the like, in a feed hopper and then fed in molten form to an extrusion nozzle by a metering pump, screw extruder or the like from which it is forced into recessed areas in continuously advancing molds under varying pressure depending on size and depth of the mold cavities. The thermoplastic material is cooled below its solidification point and stripped away in a continuous length from the molds. After texturing of the blade-like extensions and application of backing 20 the continuous length is cut into appropriate individual mat sections of about 12 in. by 18 in. (30.5 to 45.7 cm).

The soft elastomeric composition of projections 18 of mat 10 provides the property-enhancing performance of the mat as a support for a cat in and around litter box 12. When cat 13 walks across mat 10, relative movement between the paws and the multiplicity of projections cause the projections to enter nooks and crannies of the paw to spread pad portions on the downside of the paw apart so litter sticking on or between the pads is dislodged and free to fall away by gravity onto the mat surface thereby avoiding the cat dragging litter around the surrounding area as it walks away from the area of the waste containment system. With the large surface area configuration of FIG. 4, any litter kicked out of the box by the cat is interrupted and blocked in flight so as to fall by gravity onto the mat surface. In addition, independently of the cat, in evaluating the type of litter mat to purchase for an apartment, on feeling the soft projections of the inventive mat promoted by the elastomeric content of the blade composition, a cat owner is likely to choose the inventive mat over stiffer prior art structures.

The preceding description is for illustration and should not be taken as limiting. Various modifications and alterations will be readily suggested to persons skilled in the art. It is intended, therefore, that the foregoing be considered exemplary only and that the scope of the invention be ascertained from the following claims.

What is claimed is:

1. A cat litter mat having flexible, paw-engaging projections formed of thermoplastic polyolefin elastomer.

2. The mat of claim 1 wherein the projections are formed of a thermoplastic polymeric blend of 20 to 90 wt. % polyolefin elastomer and 80 to 10 wt. % polyethylene.

3. The mat of claim 2 wherein the polyethylene is low density polyethylene having a density of 0.910 to 0.925 gm. per cc.

4. The mat of claim 2 wherein the blend contains 35 to 65 wt. % elastomer.

5. The mat of any of claims 1, 2, 3 or 4 wherein the projections are grasslike, having randomly oriented tips.

* * * * *